US012649687B2

(12) United States Patent
Miura et al.

(10) Patent No.: US 12,649,687 B2
(45) Date of Patent: Jun. 9, 2026

(54) METHOD FOR PRODUCING RING-SHAPED OBJECT, FILM-FORMING DEVICE, RING-SHAPED OBJECT, AND HARD DISK DRIVE DEVICE

(71) Applicant: HOYA CORPORATION, Tokyo (JP)

(72) Inventors: Masafumi Miura, Chaing Mai Province (TH); Kazuaki Hashimoto, Akiruno (JP)

(73) Assignee: HOYA CORPORATION, Tokyo (JP)

( * ) Notice: Subject to any disclaimer, the term of this patent is extended or adjusted under 35 U.S.C. 154(b) by 251 days.

(21) Appl. No.: 18/557,585

(22) PCT Filed: May 2, 2022

(86) PCT No.: PCT/JP2022/019495
§ 371 (c)(1),
(2) Date: Oct. 26, 2023

(87) PCT Pub. No.: WO2022/231013
PCT Pub. Date: Nov. 3, 2022

(65) Prior Publication Data
US 2024/0208859 A1 Jun. 27, 2024

(30) Foreign Application Priority Data
Apr. 30, 2021 (JP) ................................. 2021-077629

(51) Int. Cl.
*C03C 17/245* (2006.01)
*G11B 33/14* (2006.01)

(52) U.S. Cl.
CPC ...... *C03C 17/2453* (2013.01); *G11B 33/1433* (2013.01); *C03C 2217/211* (2013.01); *C03C 2218/152* (2013.01); *C03C 2218/365* (2013.01)

(58) Field of Classification Search
CPC ........... C03C 17/2453; C03C 2217/211; C03C 2218/152; G11B 33/1433
See application file for complete search history.

(56) References Cited

U.S. PATENT DOCUMENTS

| | | | |
|---|---|---|---|
| 2009/0148723 A1 | 6/2009 | Tsuda | |
| 2020/0035268 A1 | 1/2020 | Osakabe | |
| 2021/0264943 A1 | 8/2021 | Osakabe | |
| 2023/0121742 A1 | 4/2023 | Osakabe | |

FOREIGN PATENT DOCUMENTS

| | | |
|---|---|---|
| JP | H02-046582 A | 2/1990 |
| JP | H09-44969 A | 2/1997 |
| JP | 2003308672 A | 10/2003 |

(Continued)

OTHER PUBLICATIONS

Translation of the International Search Report mailed on Jul. 26, 2022.

*Primary Examiner* — Nathan T Leong
(74) *Attorney, Agent, or Firm* — Spencer Fane LLP

(57) ABSTRACT
A method for producing a ring-shaped object includes: placing a ring-shaped substrate on a plate; and spraying a gas containing a coating raw material toward a center hole of the ring-shaped substrate from above the ring-shaped substrate placed on the plate to cause the ring-shaped substrate to float up from the plate and form a film on a surface of the ring-shaped substrate.

9 Claims, 6 Drawing Sheets

(56)         References Cited

FOREIGN PATENT DOCUMENTS

| | | | |
|---|---|---|---|
| JP | 2005174500 | A | 6/2005 |
| JP | 2006332311 | * | 12/2006 |
| JP | 2006332311 | A | 12/2006 |
| JP | 2008-305625 | A | 12/2008 |
| JP | 2009146471 | * | 7/2009 |
| JP | 2009146471 | A | 7/2009 |
| JP | 2015026733 | A | 2/2015 |
| WO | 2018182046 | A1 | 10/2018 |

* cited by examiner

METHOD FOR PRODUCING RING-SHAPED OBJECT, FILM-FORMING DEVICE, RING-SHAPED OBJECT, AND HARD DISK DRIVE DEVICE

CROSS-REFERENCE TO RELATED APPLICATIONS

This is a U.S. National stage application of International Patent Application No. PCT/JP2022/019495, filed on May 2, 2022, which, in turn, claims priority to Japanese Patent Application No. 2021-077629, filed on Apr. 30, 2021. The entire content of Japanese Patent Application No. 2021-077629 is hereby incorporated herein by reference.

BACKGROUND

Field of the Invention

The present invention relates to a method for producing a ring-shaped object by forming a film on the entire surface of the ring-shaped object through spraying, a film-forming device, a ring-shaped object, and a hard disk drive device.

Background Information

Following the expansion of cloud computing in recent years, many hard disk drive devices (hereinafter also referred to as HDD devices) are used in data centers for a cloud in order to increase the storage capacity.

Ring-shaped spacers are provided between magnetic disks installed in an HDD device in order to keep the magnetic disks spaced apart from each other. These spacers function to keep the magnetic disks from coming into contact with each other and precisely position the magnetic disks at predetermined positions spaced apart from each other. Conventionally, metal materials with electric conductivity and low manufacturing costs have been used as the material of these spacers. Incidentally, when the material of spacers and the material of substrates for magnetic disks have different linear expansion coefficients, such as when glass substrates are used as the substrates for magnetic disks, the spacers and the magnetic disks are in contact with each other, and thus, a change in the temperature in the HDD device results in a difference occurring in the thermal expansion between the spacers and the magnetic disks. As a result, the magnetic disks may warp and floating properties of magnetic heads may deteriorate. Deterioration in the floating properties of the magnetic heads is not preferable from the viewpoint of reading data from the magnetic disks and writing data onto the magnetic disks in the HDD device. The greater the recording density, the greater the influence of this problem is.

Therefore, in recent years, use of spacers made of glass (hereinafter referred to as "glass spacers") has been studied considering a case where glass substrates are used as substrates for magnetic disks (i.e., in order to reduce the difference between linear expansion coefficients) or in order to reduce the weight of the spacers and increase the rigidity of the spacers. However, glass is an insulator, and thus static electricity is likely to accumulate on the magnetic disks or the glass spacers due to friction between the magnetic disks and the glass spacers that rotate at high speeds and air, and the like. This is not preferable because, if the magnetic disks or the spacers are charged, foreign matter and minute particles are likely to be adsorbed thereto, and a recording element or a reproducing element of a magnetic head may break as a result of the accumulated static electricity discharging to the magnetic head.

To address this, a glass spacer in which at least a contact surface of the glass spacer that is in contact with a magnetic disk and an inner circumferential surface of the glass spacer are coated with a conductive ceramic film having a film thickness of 0.1 to 3 μm is known (JP H9-44969A). It is described that this can efficiently dissipate static electricity charged on the magnetic disk, and the contact surface is thus unlikely to be worn.

SUMMARY

Techniques such as PVD (Physical Vapor Deposition) and CVD (Chemical Vapor Deposition) are used to form a film in the production of the glass spacer described above. However, if such a film formation method is employed, there is a problem that, commonly, a film cannot be formed on a portion of the spacer that is in contact with a holding member (a support member) holding the spacer. Accordingly, a portion of the surface of the spacer held by the holding member is not covered with a film and remains exposed, and glass pieces may become microparticles and be emitted as dust from the exposed portion. In order to completely eliminate the exposed portion, it is possible to take out the spacer that has been once subjected to film formation from a film-forming device, and perform secondary film formation while holding a region of the spacer provided with the film with the holding member. However, there is a problem that the film thickness becomes uneven between portions that were in contact with the holding member and the other portions because film formation is performed twice. Also, there is a problem that the film formation process is complicated and the manufacturing cost increases.

The present invention was made to solve the problems described above, and has an object of providing technology that can increase productivity of a film formation process while suppressing unevenness of the film thickness on the surface of a ring-shaped object in a method for producing a ring-shaped object.

According to a first aspect of the present invention, provided is a method for producing a ring-shaped object, including:

placing a ring-shaped substrate on a plate; and spraying a gas containing a coating raw material toward a center hole of the ring-shaped substrate from above the ring-shaped substrate placed on the plate to cause the ring-shaped substrate to float up from the plate and form a film on a surface of the ring-shaped substrate.

In the method for producing a ring-shaped object according to the first aspect of the present invention, the plate may be a heated plate.

In the method for producing a ring-shaped object according to the first aspect of the present invention, the gas may be sprayed a plurality of times to repeatedly cause the ring-shaped substrate to float up from the plate and land on the plate a plurality of times.

In the method for producing a ring-shaped object according to the first aspect of the present invention, a spray pressure of the gas containing the coating raw material may be 0.05 to 1.0 MPa.

In the method for producing a ring-shaped object according to the first aspect of the present invention, the ring-shaped substrate may be made of a material including glass, a ceramic material, metal, or resin.

In the method for producing a ring-shaped object according to the first aspect of the present invention, the film may be an electrically conductive film or may contain an electrically conductive metal oxide.

In the method for producing a ring-shaped object according to the first aspect of the present invention, the ring-shaped object may be a spacer for a hard disk drive.

According to a second aspect of the present invention, provided is a method for producing a ring-shaped object, including:

heating processing of placing a ring-shaped substrate on a placement table to heat the ring-shaped substrate; and film formation processing of spraying a gas containing a coating raw material toward the ring-shaped substrate to cause the ring-shaped substrate to float up from the placement table and form a film on a surface of the ring-shaped substrate.

According to a third aspect of the present invention, provided is a film-forming device including:

a plate on which a ring-shaped substrate is placed;

a positioning member provided on the plate to position the ring-shaped substrate in a predetermined range on the plate; and a nozzle provided above the plate to spray a gas containing a coating raw material toward a center hole of the ring-shaped substrate positioned by the positioning member.

In the film-forming device according to the third aspect of the present invention, the positioning member may be at least one partition standing outside the predetermined range on the plate.

The film-forming device according to the third aspect of the present invention may include a plurality of the partitions, and two adjacent partitions among the partitions may be spaced apart from each other surrounding the predetermined range.

In the film-forming device according to the third aspect of the present invention, a protrusion may be provided on the plate, and the protrusion may protrude from the center hole of the ring-shaped substrate in the state where the ring-shaped substrate is positioned in the predetermined range.

In the film-forming device according to the third aspect of the present invention, the positioning member may be a protrusion provided on the plate, and the ring-shaped substrate may be positioned in the predetermined range by being disposed on the plate in such a manner that the protrusion protrudes from the center hole of the ring-shaped substrate.

The film-forming device according to the third aspect of the present invention may further include a heater for heating the plate.

According to a fourth aspect of the present invention, provided is a ring-shaped object including:

a ring-shaped substrate having a first main surface and a second main surface that are opposite to each other, an outer circumferential edge surface, and an inner circumferential edge surface; and a film formed on the entire surface of the ring-shaped substrate, wherein a film thickness on the outer circumferential edge surface is larger than a film thickness on the inner circumferential edge surface.

In the ring-shaped object according to the fourth aspect of the present invention, a film thickness on the first main surface and a film thickness on the second main surface may be larger than the film thickness on the outer circumferential edge surface.

In the ring-shaped object according to the fourth aspect of the present invention, the ring-shaped substrate may be made of a material including glass, a ceramic material, metal, or resin.

In the ring-shaped object according to the fourth aspect of the present invention, the film may be an electrically conductive film or may contain an electrically conductive metal oxide.

The ring-shaped object according to the fourth aspect of the present invention may be a spacer for a hard disk drive.

According to a fifth aspect of the present invention, provided is a hard disk drive device including: the ring-shaped object according to the fourth aspect of the present invention; a magnetic disk; and a magnetic head.

According to the present invention, it is possible to increase productivity of the film formation process while suppressing unevenness of the film thickness on the surface of a ring-shaped object in the method for producing a ring-shaped object.

BRIEF DESCRIPTION OF THE DRAWINGS

FIG. 4A shows a state where a gas containing a coating raw material is not sprayed from a nozzle. FIG. 4B shows a state where the gas containing the coating raw material is sprayed from the nozzle.

DETAILED DESCRIPTION OF THE EMBODIMENTS

First, the following describes a glass spacer that is used in an HDD device and is an example of a ring-shaped object produced with use of a production method according to the present invention.

Figure 1A:
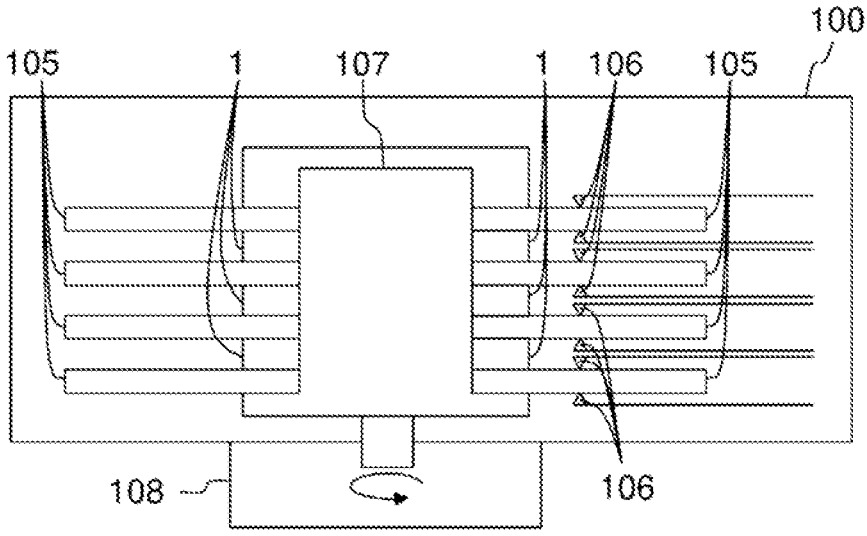
FIG. 1A is a cross-sectional view showing a main portion of an example of the structure of an HDD device in which glass spacers, which are examples of a ring-shaped object according to the present invention, are installed.

As shown in FIG. 1A, an HDD device 100 mainly includes a plurality of glass spacers 1, a plurality of magnetic disks 105, a plurality of magnetic heads 106, a spindle 107, and a spindle motor 108. In the HDD device 100, each of the glass spacers 1 is disposed between adjacent magnetic disks 105 to hold the plurality of magnetic disks 105 precisely at predetermined positions spaced apart from each other. The magnetic disks 105 and the glass spacers 1 are alternately stacked on one another with the spindle 107 extending therethrough. Note that the HDD device 100 may include a glass spacer 1 that is in contact with an upper surface of a magnetic disk 105 located at the top and a glass spacer 1 that is in contact with a lower surface of a magnetic disk 105 located at the bottom.

Figure 1B:
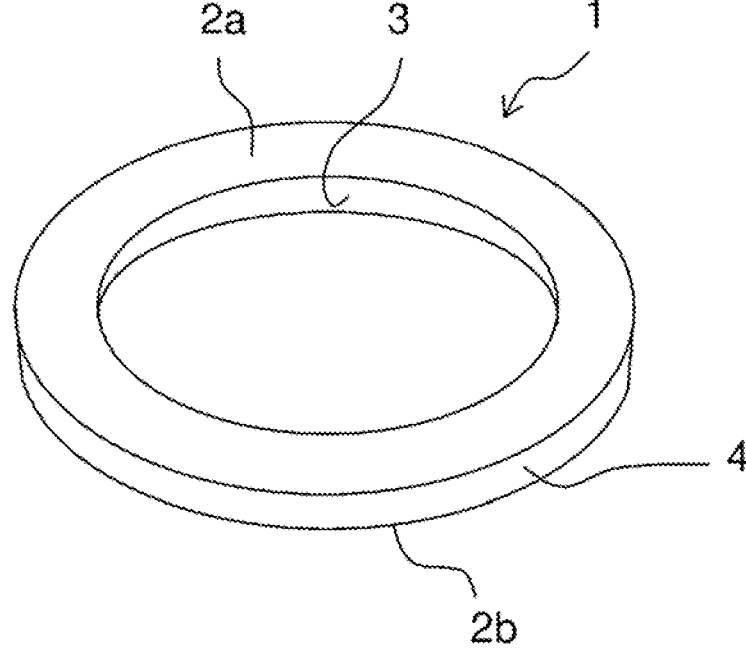
FIG. 1B is a perspective view of a glass spacer, which is an example of the ring-shaped object according to the present invention.

As shown in FIG. 1B, each glass spacer 1 has a ring shape and has two main surfaces 2a and 2b that are opposite to each other, an inner circumferential edge surface 3, and an outer circumferential edge surface 4. The main surface 2a is an annular surface whose outer edge and inner edge form two concentric circles. The main surface 2b has the same shape as the main surface 2a and is concentric with the main surface 2a. The inner circumferential edge surface 3 connects the inner edge of the main surface 2a and the inner edge of the main surface 2b. The outer circumferential edge surface 4 connects the outer edge of the main surface 2a and the outer edge of the main surface 2b. Note that chamfered surfaces may be formed at connecting portions between the inner circumferential edge surface 3 and the two main surfaces 2a and 2b and connecting portions between the outer circumferential edge surface 4 and the two main surfaces 2a and 2b. In this case, the chamfered surfaces may have a linear cross-sectional shape or an arcuate cross-sectional shape. The two main surfaces 2a and 2b come into contact with magnetic disks. The inner circumferential edge surface 3 comes into contact with the spindle 107 of the HDD device 100 and is a wall surface surrounding a hole whose inner diameter is slightly larger than the outer diameter of the spindle 107. The outer circumferential edge surface 4 does not come into contact with magnetic disks 105 and the spindle 107.

Dimensions of the glass spacers 1 can be changed as appropriate according to the specifications of the HDD device 100 in which the glass spacers 1 are to be installed. In the case where the glass spacers 1 are installed in a nominal 3.5 inch HDD device, the outer diameter is 30 to 34 mm, for example, the inner diameter is 24 to 26 mm, for example, the width in a radial direction is 2 to 5 mm, for example, and the thickness is 0.5 to 3 mm, for example. In the case where there are chamfered surfaces, the chamfered surfaces have a width of 0.01 to 0.5 mm, for example, in the radial direction and the thickness direction.

Figure 2:
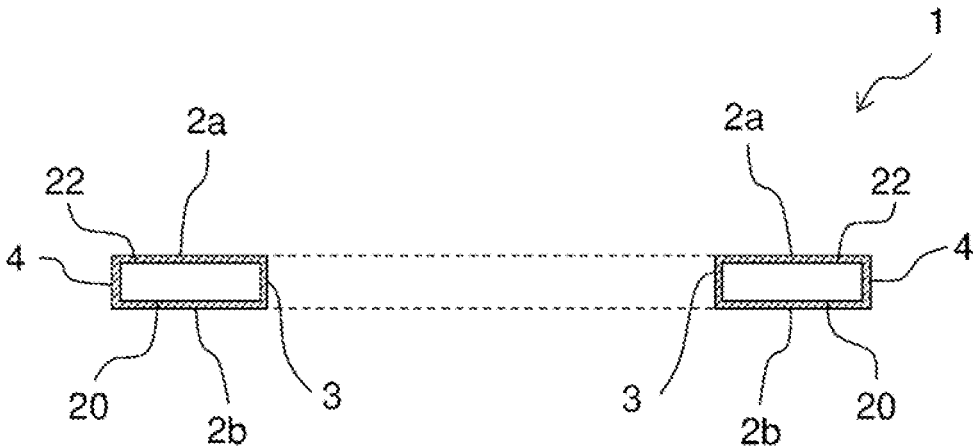
FIG. 2 is a cross-sectional view of the glass spacer, which is an example of the ring-shaped object according to the present invention.

As shown in FIG. 2, each glass spacer 1 includes a ring-shaped glass substrate 20 and a film 22 covering the entire surface of the glass substrate 20. That is, the surface of the glass substrate 20 is not exposed due to the presence of the film 22. Accordingly, static electricity is unlikely to accumulate on the glass spacer 1. Also, it is possible to prevent a situation in which a portion of the glass substrate 20 turns into microparticles and is emitted as dust and attaches to the magnetic disks. The glass substrate 20 preferably has a rectangular cross-sectional shape that is longer in the radial direction than in the thickness direction because such a glass substrate 20 can be easily caused to float up in the formation of the film 22, which will be described later.

The glass substrate 20 preferably has a thermal expansion coefficient that is substantially equal to the thermal expansion coefficient of glass substrates of the magnetic disks. The material of the glass substrate 20 is not particularly limited, and may be aluminosilicate glass, soda-lime glass, soda aluminosilicate glass, alumino-borosilicate glass, borosilicate glass, quartz glass, or the like. From the viewpoint of crystallinity, either amorphous glass or crystallized glass may be used. Note that amorphous glass has relatively high hardness and facilitates increasing the degree of surface smoothness and thus is preferable.

In the case where the glass substrate 20 is made of amorphous aluminosilicate glass, it is possible to use glass that contains 59 to 63 mass % of silicon dioxide ($SiO_2$), 5 to 16 mass % of aluminum oxide ($Al_2O_3$), 2 to 10 mass % of lithium oxide ($Li_2O$), 2 to 12 mass % of sodium oxide ($Na_2O$), and 0 to 5 mass % of zirconium oxide ($ZrO_2$), for example. This glass has high rigidity and a low thermal expansion coefficient, and thus is suitable for the glass substrate 20. In the case where the glass substrate 20 is made of soda-lime glass, it is possible to use amorphous glass that contains 65 to 75 mass % of $SiO_2$, 1 to 6 mass % of $Al_2O_3$, 2 to 7 mass % of CaO, 5 to 17 mass % of $Na_2O$, and 0 to 5 mass % of $ZrO_2$, for example. Amorphous aluminosilicate glass and amorphous soda-lime glass are relatively easy to grind and polish and facilitate increasing the degree of surface smoothness, and thus are suitable for the glass substrate 20.

A blank for the glass substrate 20 can be obtained by cutting out a glass plate produced using a float method, a down draw method, or the like into a ring shape, or molding molten glass through pressing, or slicing a glass tube produced through tube drawing. Edge surfaces (an inner circumferential edge surface and an outer circumferential edge surface) and main surfaces of the thus formed ring-shaped glass are ground and/or polished to obtain the glass substrate 20.

There is no particular limitation on the method for grinding the edge surfaces, and the edge surfaces can be ground using a formed grindstone including #80 to #1000 diamond abrasive particles, for example. At this time, chamfered surfaces can be formed at the same time. It is also possible to polish the edge surfaces with a polishing brush including a bristle material made of nylon or the like. These types of edge surface processing can be performed by bringing the ring-shaped glass and the formed grindstone or the polishing brush into contact with each other while rotating the ring-shaped glass and the formed grindstone or the polishing brush, similarly to processing performed on edge surfaces of glass substrates for magnetic disks. It is also possible to chemically polish the glass with an etching solution containing hydrofluoric acid or fluorosilicic acid.

The film 22 is an electrically conductive film and may contain an electrically conductive metal oxide or an electrically conductive ceramic material. For example, the film 22 may contain tin oxide ($SnO_2$), zinc oxide (ZnO), or titanium oxide ($TiO_2$). Also, the film 22 may contain FTO formed by doping tin oxide with fluorine or AZO formed by doping zinc oxide with aluminum oxide ($Al_2O_3$). The conductivity of the film 22 can be set as appropriate according to the need. For example, the surface resistivity of the film 22 at 22[° C.] is $10^8$ [$\Omega$/sq] or less.

The thickness of the film 22 is preferably 200 nm or less, and more preferably less than 100 nm. If the thickness is more than 200 nm, the manufacturing cost may become excessively high. If the thickness is 100 nm or more, surface irregularities of the film 22 may become excessively large. If raised portions of the film 22 are excessively large, some of the raised portions may be removed from the film 22 when the film 22 comes into contact with a magnetic disk, and the removed portions may become microparticles and be emitted as dust, which may lead to crashing of a magnetic head. On the other hand, the thickness of the film 22 is preferably 5 nm or more, and more preferably 10 nm or more in order to prevent emission of dust and elution of ions from the surface of the substrate. Also, the outer circumferential edge surface 4 of the glass spacer 1 is close to a magnetic head when the glass spacer 1 is installed in the HDD, and accordingly, emission of dust from the outer circumferential edge surface 4 is likely to lead to breakdown of the HDD. Therefore, the film thickness on the outer circumferential edge surface 4 is preferably larger than the film thickness on the inner circumferential edge surface 3. Making the film thickness on the outer circumferential edge surface 4 larger than the film thickness on the inner circumferential edge surface 3 makes it easy to prevent the above-described problem. The film thickness on each surface can be measured at a center portion of each surface, for example.

Film-Forming Device 10

Figure 3:
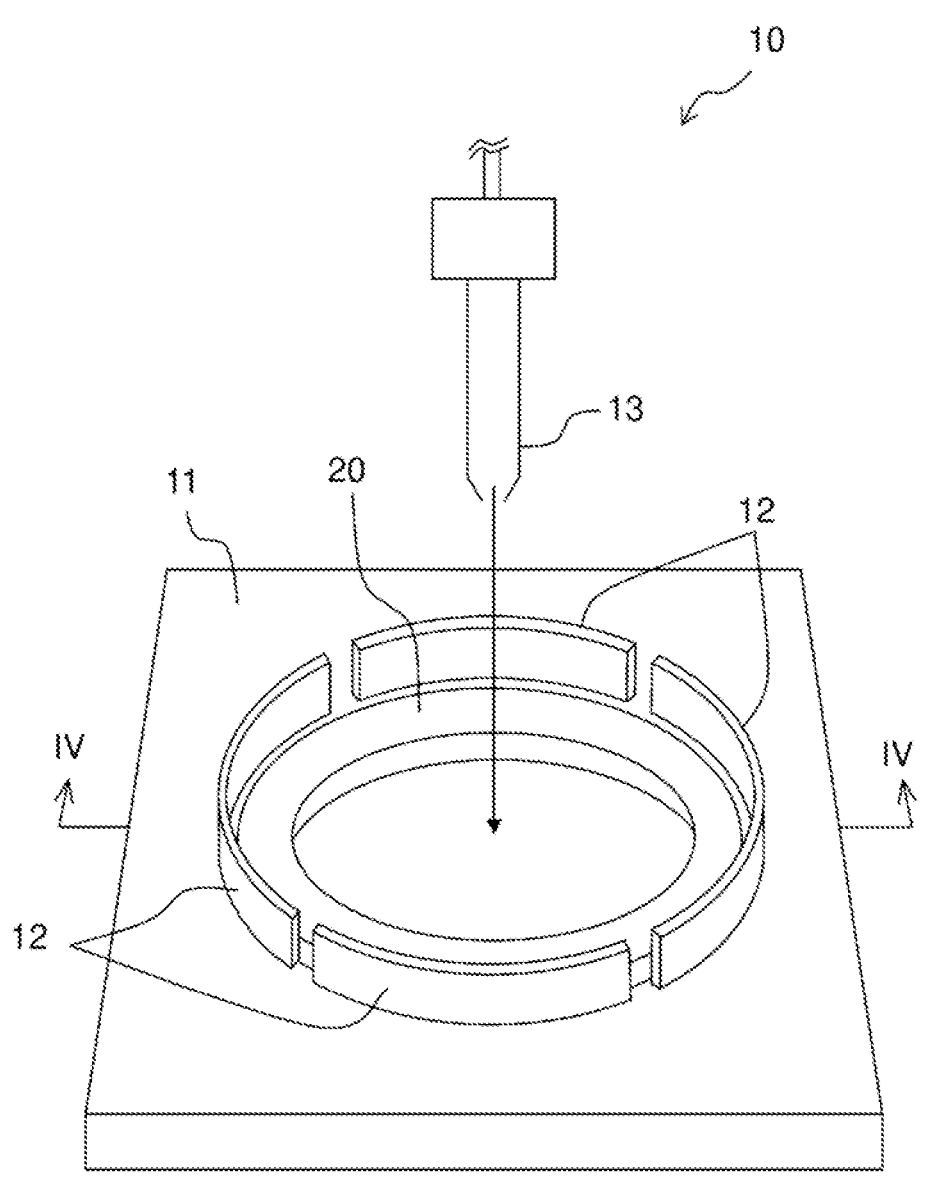
FIG. 3 is a diagram showing an example of a film-forming device that is used in a method for producing a ring-shaped object according to the present invention.

Next, the following describes a film-forming device 10 for producing the glass spacer 1 described above, which is an example of a film-forming device that is used in the production method according to the present invention, with reference to FIG. 3.

The film-forming device 10 includes: a plate 11 (also referred to as a "placement table") for placing the ring-shaped glass substrate 20, which is an example of the ring-shaped substrate; a positioning member 12 provided on the plate 11; a nozzle 13 for spraying a gas containing a raw material of the film 22; and a housing (a chamber) for housing the plate 11, the positioning member 12, and the nozzle 13. Note that the housing is omitted in FIG. 3.

Plate 11

The plate 11 is a metal plate including a heating means such as an electric heater, for example, and is capable of heating the glass substrate 20 that is placed on the upper surface (also referred to as a "placement surface") of the plate 11 to be in contact with the upper surface. In the present specification, the state where a ring-shaped substrate such as the glass substrate 20 is placed on the upper surface (the placement surface) of the plate 11 (the placement table) includes a state where the ring-shaped substrate has fallen from a floating state, which will be described later, and landed on the upper surface of the plate 11. The heating temperature of the glass substrate 20 can be adjusted as appropriate according to the film to be formed. In the formation of a conductive tin oxide film 22, the heating temperature is 300° C. to 600° C., for example. The material of the plate 11 only needs to be able to withstand the heating temperature set according to the film to be formed. For example, the plate 11 may be made of glass, a ceramic material, or the like, instead of metal. It is preferable that at least a region in the surface of the plate 11 that may come into contact with the glass substrate 20 is flat so that the glass substrate can be efficiently heated while in contact with the region of the surface of the plate 11. Also, an arithmetic average surface roughness Ra of the plate 11 is preferably 5 µm or less, and more preferably 3 µm or less. If the Ra is more than 5 µm, it may be difficult to rapidly heat the glass substrate due to a reduction in the area of contact with the glass substrate, and the surface of the glass substrate may be damaged when the glass substrate falls from the floating state. The Ra can be measured with use of a stylus surface roughness meter, for example. The plate 11 has a rectangular shape, for example, and the length of each side of the plate 11 is larger than the outer diameter of the glass substrate 20. That is, the plate 11 is large enough to accommodate the entire glass substrate 20.

Positioning Member 12

The positioning member 12 is provided in order to prevent the glass substrate 20 placed on the upper surface of the plate 11 from flying out of a predetermined range on the upper surface of the plate 11 due to a gas flow formed when the gas containing the raw material of the film 22 is sprayed from the nozzle 13. The positioning member 12 also has a function of keeping the concentration of the gas containing the raw material of the film 22 high around the glass substrate 20 to reduce variation in the film thickness over the entire surface of the glass substrate 20 and increase the formation rate of the film 22. The positioning member 12 is constituted by one or more partitions standing outside the predetermined range on the upper surface of the plate 11 in such a manner as to surround the predetermined range. The material of the one or more partitions is metal, glass, a ceramic material, or a combination of two or more of these materials, for example. Note that the predetermined range on the upper surface of the plate 11 refers to a circular range that has a diameter larger than the outer diameter of the glass substrate 20 by about 3% to 50%, for example. The predetermined range is more preferably a circular range having a diameter larger than the outer diameter of the glass substrate 20 by about 5% to 30%. Accordingly, in the state where the glass substrate 20 is placed in the predetermined range on the upper surface of the plate 11, there is a space between the outer circumferential edge surface of the glass substrate 20 and an inner side surface of the positioning member 12 at least partially along the outer circumferential direction of the glass substrate 20. In other words, the positioning member 12 is spaced apart from the outer circumferential edge surface of the glass substrate 20 by a predetermined distance (i.e., in such a manner as to form a predetermined gap). The gap needs to be secured not only when the glass substrate 20 is placed on the upper surface of the plate 11 (when the height from the plate 11 is zero) but also when the height from the plate 11 has changed, assuming the state where the glass substrate 20 is floating, but the size of the gap does not necessarily have to be constant in the height direction. Owing to this gap, a film can be formed on the outer circumferential edge surface of the glass substrate 20 as well. In the case where the positioning member 12 is constituted by a plurality of partitions, two adjacent partitions are spaced apart from each other. That is, there is a gap between the two adjacent partitions. Although the size of this gap is not particularly limited as long as the glass substrate 20 floats stably, the size may be 1% to 15% of the circumference of an imaginary circle whose radius is equal to a distance from the center of the circular range described above (the predetermined range on the upper surface of the plate 11) to each end of the gap, for example. In the case where the positioning member 12 is constituted by a plurality of partitions, the number of partitions is preferably three or more. In this case, it is possible to arrange gaps in a well-balanced manner around the glass substrate 12, and accordingly, it is possible to increase floating stability. The shape of the positioning member 12 (more specifically, the shape of a wall surface of the positioning member 12 on the glass substrate 20 side) as viewed from above the upper surface of the plate 11 may be any of various shapes such as a circle, an arc, a curved line, a straight line, a bent line, or a combination of any of these. The height of the positioning member 12 can be determined as appropriate according to the thickness of the glass substrate 20 and the height to which the glass substrate 20 is caused to float up during the formation of a film. For example, the height is 5 to 50 mm. It is also possible to further provide a member for preventing the glass substrate 20 from flying out over the positioning member 12 due to a gas flow. For example, eaves protruding toward the glass substrate 20 may be provided in an upper portion of the positioning member 12. The eaves preferably have a shape that does not hinder the flow of gas sprayed from the nozzle 13.

Nozzle 13

The nozzle 13 is positioned above the plate 11 in the housing in such a manner that a center axis of the nozzle 13 (a spray center axis) is inside the center hole of the glass substrate 20 in the state where the glass substrate 20 is placed in the predetermined range on the upper surface of the plate 11. The center axis of the nozzle 13 preferably extends in the vertical direction. Also, the center axis of the nozzle 13 preferably passes through the center of the predetermined range. The raw material of the film 22 is sprayed together with a gas such as air from the nozzle 13 toward the center hole of the glass substrate 20 placed in the predetermined range on the upper surface of the plate 11. Accordingly, the raw material of the film 22 turns into micro droplets (mist) and moves or floats within the housing. Note that the spray pressure of the nozzle 13 can be set to 0.05 to 1.0 MPa, for example. For example, in the formation of a tin oxide film 22, a liquid obtained by dissolving an organic tin compound such as dibutyltin diacetate or dimethyltin dichloride in a solvent such as ethanol can be used as the raw material of the film 22.

Method for Producing Glass Spacer 1

Figure 4A:
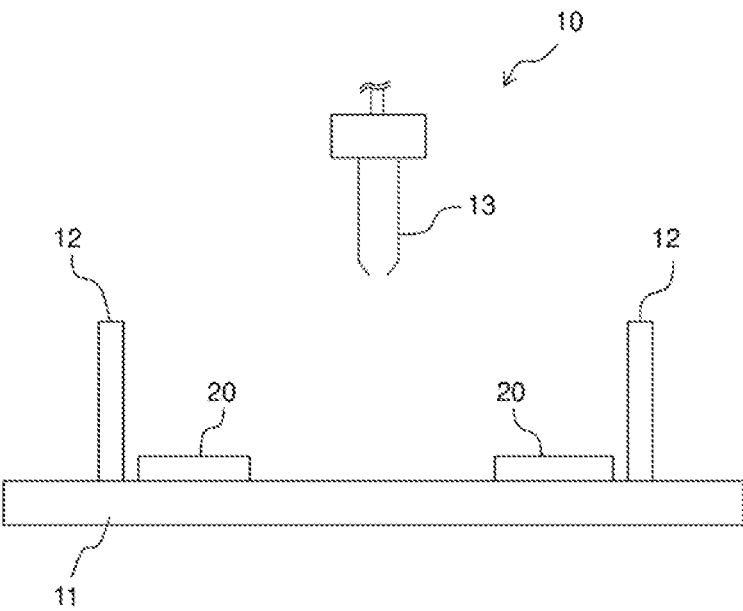
FIGS. 4A and 4B are cross-sectional views taken along the line IV-IV shown in FIG. 3.
Figure 4B:
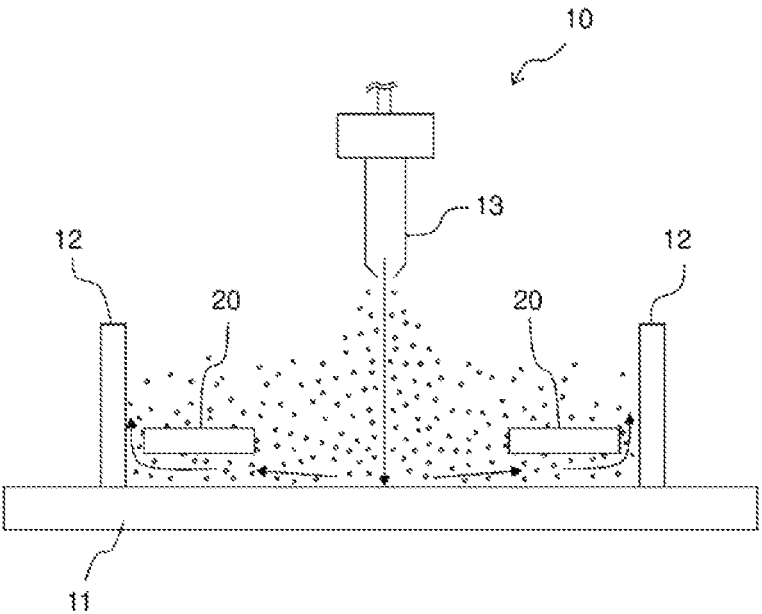

Next, the following describes a method for producing the glass spacer 1 as an example of a method for producing a ring-shaped object according to the present invention, with reference to FIGS. 4A and 4B. Note that the housing is omitted in FIGS. 4A and 4B.

First, the glass substrate 20 is placed in the predetermined range on the upper surface of the plate 11 as shown in FIG. 4A. That is, the glass substrate 20 is placed inside the positioning member 12. Then, the plate 11 is heated with the electric heater to heat the glass substrate 20 placed on the upper surface of the plate 11 to 400° C., for example.

Next, a gas containing the raw material of the film 22 is sprayed from the nozzle 13 toward the center hole of the glass substrate 20 as shown in FIG. 4B. The gas sprayed from the nozzle 13 passes through the center hole of the glass substrate 20, collides with the upper surface of the plate 11, then flows along the upper surface of the plate 11 outward in a radial direction of the glass substrate 20, and flows into a narrow space between the lower surface of the glass substrate 20 and the upper surface of the plate 11. As a result, the glass substrate 20 floats up from the upper surface of the plate 11. A portion of gas that has passed through the space between the lower surface of the glass substrate 20 and the upper surface of the plate 11 passes through a gap between partitions constituting the positioning member 12, and flows to the outside of the positioning member 12. The remaining portion of gas flows upward along the inner side surface of the positioning member 12 in the space between the outer circumferential edge surface of the glass substrate 20 and the inner side surface of the positioning member 12. That is, the gas sprayed from the nozzle 13 flows as shown by solid line arrows in FIG. 4B. As a result, the glass substrate 20 floats up from the plate 11, and the mist of the raw material of the film 22 floating inside the housing attaches not only to the upper surface, the inner circumferential edge surface, and the outer circumferential edge surface of the glass substrate 20 but also to the lower surface of the glass substrate 20. That is, the mist of the raw material of the film 22 attaches to the entire surface of the glass substrate 20. At this time, the glass substrate 20 has been heated, and accordingly, when the mist of the raw material of the film 22 attaches to the surface of the glass substrate 20, the solvent evaporates and a chemical reaction of the organic compound dissolved in the solvent occurs, and the solid film 22 is formed on the entire surface of the glass substrate 20.

On the other hand, the temperature of the glass substrate 20 decreases due to the glass substrate 20 floating and separating from the plate 11 and the solvent that has attached to the glass substrate 20 evaporating. Therefore, once the gas containing the raw material of the film 22 has been sprayed from the nozzle 13 and the glass substrate 20 has floated above the plate 11 for a certain period of time, spraying from the nozzle 13 is ceased for a certain period of time. Thus, the floating glass substrate 20 is caused to land on the upper surface of the plate 11, and the glass substrate 20 on which the film 22 has been partially formed is heated again.

By repeatedly spraying the gas from the nozzle 13 and ceasing the spraying a plurality of times, or in other words, by spraying the gas from the nozzle 13 intermittently, it is possible to form the film 22 having desired physical properties and thickness on the entire surface of the glass substrate 20 so as not to expose any portion of the surface of the glass substrate 20 at all, while keeping the temperature of the glass substrate 20 at a predetermined temperature.

Note that, in order to make the glass substrate 20 float more stably, it is preferable to provide a spiral protrusion on the inner wall of the nozzle 13 so that the gas containing the raw material of the film 22 is sprayed spirally, for example.

According to the method for producing a ring-shaped object described above, it is possible to form a film on the upper surface, the lower surface, the inner circumferential edge surface, and the outer circumferential edge surface of the ring-shaped substrate at the same time with the simple method of spraying the gas containing the raw material of the film from the nozzle toward the center hole of the ring-shaped substrate. Also, it is possible to easily control the film thickness by intermittently spraying the gas from the nozzle. As a result, it is possible to produce a ring-shaped object that has very small variation in the film thickness between the two main surfaces, the inner circumferential edge surface, and the outer circumferential edge surface while increasing the productivity of the ring-shaped object. In particular, the coating film can be formed without variation because the gas containing the raw material of the film can be brought into contact with the floating glass substrate 20 without the glass substrate 20 being supported by a jig or the like. Also, impurities are unlikely to be mixed in the coating film.

Also, the ring-shaped substrate repeatedly floats up from the plate and lands on the plate a plurality of times as a result of the gas being intermittently sprayed from the nozzle. The ring-shaped substrate whose temperature has decreased due to floating up from the heated plate is heated again upon landing on the plate again. That is, it is possible to easily control the temperature and the heating time of the ring-shaped substrate during the film formation. For example, in the formation of a conductive tin oxide film, if the temperature of the substrate is too low, a chemical reaction of the organic compound included in the raw material of the film does not progress sufficiently, and the film may not be formed sufficiently, and therefore, it is very important to keep the substrate at a high temperature. That is, the method according to the present disclosure is very suitable for a method for forming a film through spraying that requires heating a substrate to a high temperature.

Moreover, the predetermined range on the plate 11 is a circular range having a diameter larger than the outer diameter of the glass substrate 20 by about 3% to 50%, and in the state where the glass substrate 20 is placed in the predetermined range on the upper surface of the plate 11, there is a space (a gap) between the outer circumferential edge surface of the glass substrate 20 and the inner side surface of the positioning member 12 at least partially along the outer circumferential direction of the glass substrate 20. Therefore, while the glass substrate 20 is being caused to float above the plate 11 by the gas sprayed from the nozzle 13, the glass substrate 20 trembles or rocks inside the positioning member 12. It is possible to obtain an effect of reducing variation in the film thickness in each surface of the glass substrate 20 due to the glass substrate 20 trembling or rocking.

Example 1

The ring-shaped glass substrate 20 was placed on the upper surface of the plate 11 of the film-forming device 10 and heated. The glass substrate 20 had an outer diameter of 32 mm, an inner diameter of 25 mm, and a thickness of 2 mm. The film-forming device 10 included a heatable placement surface (a plate) that was made of stainless steel and four arcuate partitions having the same shape (height: 30 mm). The four partitions were arranged in such a manner that a circular space (corresponding to the "predetermined range" described above) having a diameter of 36 mm was formed inside the partitions and the partitions were arranged at intervals of 90 degrees and spaced apart from each other by a distance of 10 mm along the circumference (see FIG. 3). That is, the glass substrate 20 was placed in such a manner that a gap with a width of 2 mm was formed between the outer circumferential edge surface of the glass substrate 20 and the partitions when the center of the glass substrate 20 coincided with the center of the circular range inside the four partitions. After the glass substrate 20 was heated to 400° C., air containing a film formation liquid was sprayed from the nozzle 13 toward the center hole of the glass substrate 20. The spray pressure of the nozzle 13 was set to 0.3 MPa. While the air was being sprayed, the glass substrate 20 floated above the upper surface of the plate 11. The air was sprayed for 0.5 seconds each time because the temperature of the glass substrate 20 decreases due to the glass substrate 20 floating up from the upper surface of the plate 11. Each time the air was sprayed for 0.5 seconds, spraying of the air was ceased to cause the glass substrate 20 to land on the upper surface of the plate 11 and to heat the glass substrate 20 to 400° C. again. The above-described operations were repeated 100 times. That is, the glass substrate 20 was caused to floated up 100 times from the upper surface of the plate 11 by spraying the air from the nozzle 13. Note that a liquid mixture of organotin and ethanol was used as the film formation liquid. As a result, a glass spacer 1 provided with a conductive tin oxide film 22 on the entire surface of the glass substrate 20 was obtained. A cross section of the glass spacer 1 was checked with use of a scanning electron microscope (SEM), and it was found that the main surface 2a, the main surface 2b, the inner circumferential edge surface 3, and the outer circumferential edge surface 4 (which will also be referred to as "four major surfaces") had film thicknesses of 63 nm, 63 nm, 57 nm, and 61 nm, respectively. That is, variation between the film thicknesses (the largest film thickness—the smallest film thickness) on the four major surfaces of the obtained glass spacer 1 was 6 nm, which is very small. Note that the film thicknesses on the inner circumferential edge surface 3 and the outer circumferential edge surface 4 were smaller than the film thickness on the main surface 2a and the film thickness on the main surface 2b, and the film thickness on the outer circumferential edge surface 4 was larger than the film thickness on the inner circumferential edge surface 3. Also, the entire surface of the glass spacer 1 had no mark that would have been formed had the glass spacer 1 been held by a holding member. The surface resistivity of the film 22 was measured and found to be $10^8$ [Ω/sq] or less at 22[° C.]. Note that, when a film thickness variation percentage of the four major surfaces of the glass spacer 1 is defined as: (the largest film thickness—the smallest film thickness)/ (average film thickness)×100(%), the glass spacer 1 had a film thickness variation percentage of about 9.8%. Here, when the film thickness variation percentage is 30% or less, the film thickness distribution is small when compared with a case where a conventional film formation method of separately forming films on the front surface and the rear surface is used, and accordingly, it is possible to reduce the cost by reducing the film thickness over the entire surface while securing conductivity, and thus a film thickness variation percentage of 30% or less is preferable. The film thickness variation percentage is more preferably 25% or less, further preferably 20% or less, yet more preferably 15% or less, and particularly preferably 10% or less.

Here, the film thickness variation percentage in the case of the conventional film formation method is calculated. In a case where the substrate is turned upside down after a film is formed on a main surface of the substrate, then a film is formed on the other main surface of the substrate, and a film with the same thickness as that formed on each main surface is also formed on the inner circumferential edge surface and the outer circumferential edge surface of the substrate while the films are formed on the main surfaces, the ratio between film thicknesses on the main surface 2a, the main surface 2b, the inner circumferential edge surface 3, and the outer circumferential edge surface 4 is theoretically 1:1:2:2. At this time, the film thickness variation percentage is 66.7%. Accordingly, a film thickness variation percentage of 30% or less is no greater than half of the film thickness variation percentage in the conventional case, and it can be said that variation in the film thickness is sufficiently small.

Example 2

Next, while a tin oxide film 22 was formed on the surface of the glass substrate 20 in the same manner as in Example 1, the number of times spraying and heating described above were repeated was changed from 100 to 70. Film thicknesses measured on the four major surfaces: the main surface 2a, the main surface 2b, the inner circumferential edge surface 3, and the outer circumferential edge surface 4 were 47 nm, 48 nm, 40 nm, and 45 nm, respectively. Variation between the film thicknesses (the largest film thickness—the smallest film thickness) was 8 nm, and the film thickness variation percentage defined as described above was about 17.8%, which is within the preferable range. The relationship between the film thicknesses on the four major surfaces, the presence or absence of a mark formed as a result of being held by a holding member, and the surface resistivity of the film 22 were similar to those in Example 1.

Example 3

Next, while a tin oxide film 22 was formed on the surface of the glass substrate 20 in the same manner as in Example 1, the number of times spraying and heating described above were repeated was changed from 100 to 30. Film thicknesses measured on the four major surfaces: the main surface $2a$, the main surface $2b$, the inner circumferential edge surface 3, and the outer circumferential edge surface 4 were 25 nm, 25 nm, 19 nm, and 23 nm, respectively. Variation between the film thicknesses (the largest film thickness—the smallest film thickness) was 6 nm, and the film thickness variation percentage defined as described above was about 26.8%, which is within the preferable range. The relationship between the film thicknesses on the four major surfaces, the presence or absence of a mark formed as a result of being held by a holding member, and the surface resistivity of the film 22 were similar to those in Example 1.

A plurality of glass spacers 1 produced with use of the method of Example 1 were sandwiched between a plurality of magnetic disks as shown in FIG. 1 to produce an HDD device, and a test was carried out by recording and reproducing signals with magnetic heads. The HDD device operated normally without no abnormality due to static electricity, microparticles, or the like. Similar results were obtained for glass spacers 1 produced in Examples 2 and 3.

Variation

Although an embodiment of the present invention has been described, the present invention is not limited to the above embodiment, and various changes can be made within the scope of the claims. The following describes variations of the above embodiment.

In the above embodiment, the glass substrate 20 has a rectangular cross-sectional shape, but there is no limitation to this example. The glass substrate 20 may have a circular cross-sectional shape or an elliptical cross-sectional shape, for example, as long as the glass substrate 20 floats up when a gas is sprayed. From the viewpoint of floating properties of the glass substrate 20 when a gas is sprayed, it is preferable that the glass substrate 20 has a cross section that is longer in the radial direction than in the thickness direction.

In the above embodiment, the glass spacer 1 used in an HDD device is described as an example of the ring-shaped object, but there is no limitation to this example, and the ring-shaped object may be a washer or packing.

In the above embodiment, the ring-shaped glass substrate 20 is described as an example of the ring-shaped substrate, but there is no limitation to this example. The ring-shaped substrate may be: a ring-shaped metal substrate made of a metal such as aluminum (including an aluminum alloy), stainless steel, or titanium (including a titanium alloy); a ring-shaped resin substrate made of a resin such as PDAP (diallyl phthalate), PAI (polyamide imide), PTFE (polytetrafluoroethylene), PPS (polyphenylene sulfide), PI (polyimide), SI (silicone), or PEEK (polyether ether ketone); or a ring-shaped ceramic substrate made of a ceramic material such as alumina, mullite, or zirconia, for example. Alternatively, the ring-shaped substrate may be a composite body made of two or more materials selected from glass, ceramic materials, metals, and resins. The film may also be a film of paint or another functional film that requires heating of the substrate.

The positioning member 12 does not necessarily have to be constituted by a plurality of partitions, and may also be constituted by a single annular partition standing in such a manner as to surround the outer circumference of the predetermined range. That is, a configuration is also possible in which a gap is not formed between two adjacent partitions as in the above embodiment. It is also possible to provide one or more holes (openings) in the single annular partition. Such openings may be provided in a lower portion of the partition in such a manner as to reach the upper surface of the plate 11 or in an upper portion of the partition in such a manner as to be open upward to the air. In other words, the openings may be formed as notches in the lower edge or the upper edge of the partition. Alternatively, the openings may be provided in an intermediate portion of the partition in the height direction so as not to reach the lower edge and the upper edge of the partition. However, if the gap or the openings described above are too small or are not provided at all, the ring-shaped substrate may fly out over the partition when a gas is sprayed. Accordingly, it is necessary to increase the height of the partition or weaken the discharge of gas. If the height of the partition is increased, it may be difficult to take out the ring-shaped object from inside the partition after the film formation. Also, if the discharge of gas is weakened, the film formation rate may decrease. Therefore, it is preferable to provide the positioning member 12 with one or more gaps or openings that allow a portion of gas sprayed from the nozzle to escape to the outside of the positioning member 12. The area of such gaps or openings is preferably 10% to 90%, and more preferably 20% to 70% of the area of the partition (the single annular partition) that is not provided with any gaps and openings.

Also, for example, a cone-shaped protrusion may be provided in the predetermined range on the upper surface of the plate 11 irrespective of the presence or absence of the positioning member 12. The protrusion may be disposed in such a manner that the top of the protrusion protrudes from the center hole of the glass substrate 20 when the glass substrate 20 is placed in the predetermined range. In this case, when a gas containing the raw material of the film is sprayed from the nozzle 13 toward the top of the protrusion, the gas is likely to flow into the space between the lower surface of the glass substrate 20 and the upper surface of the plate 11, which facilitates floating of the glass substrate 20 from the plate 11.

The predetermined range on the plate 11 may be a circular range that has the same diameter as the outer diameter of the glass substrate 20, and a configuration is also possible in which there is no space between the outer circumferential edge surface of the glass substrate 20 and the inner side surface of the positioning member 12 in the state where the glass substrate 20 is placed in the predetermined range on the plate 11. However, from the viewpoint of reducing variation between the film thicknesses on the surfaces of the ring-shaped substrate, it is preferable that a space is formed at least partially between the outer circumferential edge surface of the glass substrate 20 and the inner side surface of the positioning member 12 in the state where the glass substrate 20 is placed in the predetermined range on the plate 11.

The film-forming device 10 does not necessarily have to include a housing structure. That is, a configuration is also possible in which the film-forming device 10 does not include the housing (chamber) for housing the plate 11, the positioning member 12, and the nozzle 13.

Figure 5A:
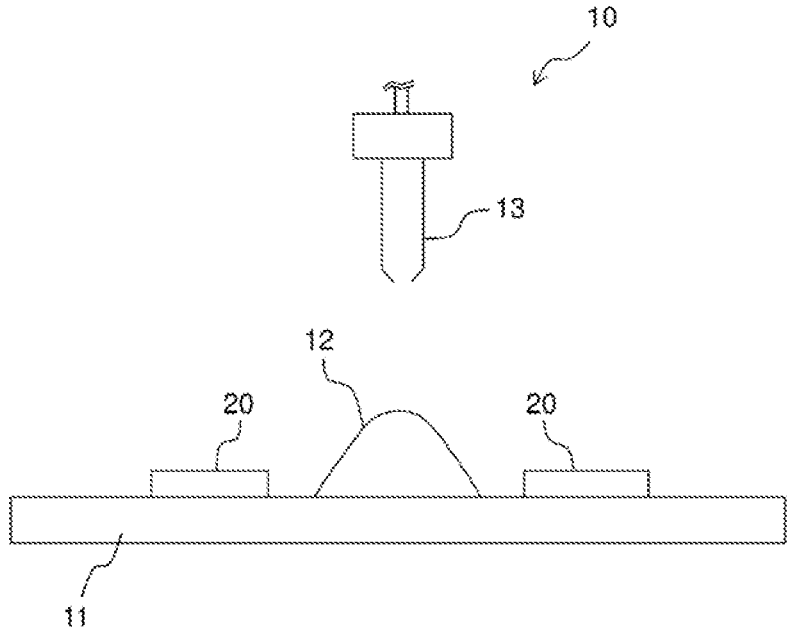
FIG. 5A is a diagram corresponding to FIG. 4A and showing a variation of a positioning member.
Figure 5B:
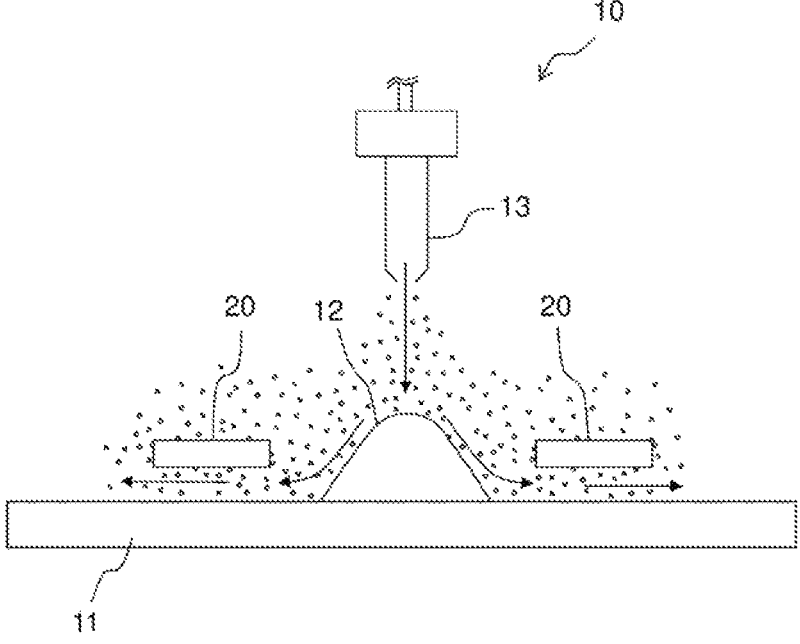
FIG. 5B is a diagram corresponding to FIG. 4B and showing the variation of the positioning member.

In the above embodiment, a plurality of partitions standing on the upper surface of the plate 11 are described as an example of the positioning member 12, but there is no limitation to this example. As shown in FIGS. 5A and 5B, a cone-shaped protrusion may be provided as the positioning member 12 in the predetermined range on the upper surface of the plate 11, for example. As shown in FIG. 5A, the protrusion may be disposed in such a manner that the top of the protrusion protrudes from the center hole of the glass substrate 20 in the state where the glass substrate 20 is placed in the predetermined range on the upper surface of the plate 11. In this case, as shown in FIG. 5B, when a gas containing the raw material of the film is sprayed from the nozzle 13 toward the top of the protrusion, the gas is likely to flow into the space between the lower surface of the glass substrate 20 and the upper surface of the plate 11, and thus floating of the glass substrate 20 from the plate 11 is facilitated. Also, even if the glass substrate 20 floating above the plate 11 trembles or rocks while the gas containing the raw material of the film 22 is sprayed from the nozzle 13, the inner circumferential edge surface of the glass substrate 20 is caught on the protrusion, and therefore, the glass substrate 20 can be kept from flying out of the predetermined range.

In the above embodiment, a recessed portion or a groove may be provided in the upper surface of the plate 11 as long as the recessed portion or the groove does not hinder heating of the glass substrate 20. For example, a plurality of recessed portions may be arranged in a circumferential direction and/or a radial direction of a circle whose center is an intersection between the center axis of the nozzle 13 and the upper surface of the plate 11, or a groove extending in the circumferential direction and/or the radial direction of the circle may be provided, or recessed portions and a groove may be combined. By providing the recessed portions and/or the groove appropriately, it is possible to control the flow of sprayed gas and increase the floating stability of the glass substrate 20.

Figure 6:
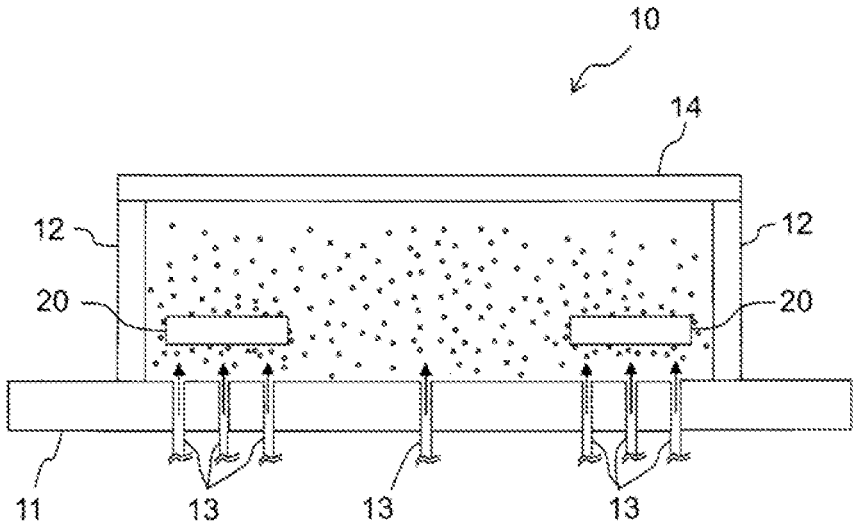
FIG. 6 is a diagram corresponding to FIG. 4B and showing a variation of a method for causing a ring-shaped glass substrate, which is an example of a ring-shaped substrate, to float up from a plate.

In the above embodiment, a gas containing the raw material of the film 22 is sprayed from the nozzle 13 that is above the glass substrate 20 toward the center hole of the glass substrate 20 to cause the glass substrate 20 to float up from the upper surface of the plate 11 in the formation of the film 22 on the surface of the glass substrate 20, but there is no limitation to this method for floating the glass substrate 20. For example, as shown in FIG. 6, a gas containing the raw material of the film 22 may be sprayed from a plurality of nozzles 13 that are open in the upper surface of the plate 11 toward the lower surface of the glass substrate 20 placed on the upper surface of the plate 11 to cause the glass substrate 20 to float up from the upper surface of the plate 11. In this case, the plurality of nozzles 13 need to be provided in such a manner as to be open in the upper surface of the plate 11. The spray pressure of the gas containing the raw material of the film 22 can be set appropriately so that the glass substrate 20 floats up from the upper surface of the plate 11. The spray pressure can be set to 0.01 to 1.0 MPa, for example. Although the positioning member 12 may have specifications similar to those in the above embodiment, an upper cover 14 may also be provided above the positioning member 12 from the viewpoint of preventing the glass substrate 20 from flying out over the positioning member 12 when the gas containing the raw material of the film 22 is sprayed and the viewpoint of increasing the concentration of the gas containing the raw material of the film 22 to make the film thickness distribution uniform and increase the film formation rate. In a case where the positioning member 12 is constituted by a single annular partition that does not include an opening and a film formation space defined by the plate, 11, the positioning member 12, and the upper cover 14 is hermetically sealed, spraying of the gas containing the raw material of the film 22 from the plurality of nozzles 13 is hindered. Therefore, the upper cover 14 may be provided with an opening that allows the gas containing the raw material of the film 22 to escape from the film formation space. The percentage of the area of the opening in the upper cover 14 is preferably 50% or less, and more preferably 30% or less from the viewpoint of making the film thickness distribution uniform and increasing the film formation rate.

In this case, it is preferable to alternately repeat heating processing of placing the glass substrate 20 on the upper surface of the plate 11 to heat the glass substrate 20 and film formation processing of forming the film 22 on the entire surface of the glass substrate 20 by making the glass substrate 20 float up from the upper surface of the plate 11. In other words, it is preferable to spray the gas containing the raw material of the film 22 a plurality of times so that the glass substrate 20 repeatedly floats up from the upper surface of the plate 11 and lands on the upper surface of the plate 11 a plurality of times. While the glass substrate 20 is floating above the upper surface of the plate 11, the film 22 is formed on the surface of the glass substrate 20, but the temperature of the glass substrate 20 decreases. If the temperature of the glass substrate 20 becomes excessively low, a chemical rection of the raw material of the film 22 may not progress sufficiently, and the film 22 may not be formed. It is possible to restore the temperature of the glass substrate 20 that has decreased due to floating, by causing the glass substrate 20 to land on the upper surface of the plate 11 after floating above the upper surface of the plate 11.

In the above embodiment, the plate 11 includes a heating means such as an electric heater and the glass substrate 20 is heated by coming into contact with the plate 11, but there is no limitation to this example. A configuration is also possible in which the plate 11 does not include the heating means and the glass substrate 20 is heated in a contactless manner with use of infrared rays, for example.

In the above embodiment, the spray pressure may be gradually reduced when spraying of the gas containing the raw material is to be ceased. Thus, it is possible to suppress damage to the glass substrate 20 and the film 22 when the glass substrate 20 falls onto the plate 11.

In the above embodiment, a single glass substrate 20 is placed on the plate 11, but it is also possible to form films on a plurality of glass substrates 20 on the plate 11 at the same time. In this case, the area of the plate 11 is increased, and positioning members 12 and nozzles 13 can be provided according to the number of glass substrates 20 on which films are to be formed.

The nozzle 13 used in the above embodiment is merely an example, and the outlet of the nozzle may be processed in such a manner that a gas shoots out in a ring shape along the center axis of the nozzle 13. Also, the nozzle 13 may have a plurality of gas outlets. For example, it is possible to provide a side surface of the nozzle 13 with a plurality of outlets for spraying a gas in a horizontal direction, install the nozzle 13 at a height near the plate 11 and at the center of the predetermined range, and spray the gas toward the inner circumferential edge surface of the glass substrate 20 or a portion of the inner circumferential edge surface that is in contact with the plate 11.

The invention claimed is:

1. A method for producing a ring-shaped object, comprising:
    placing a ring-shaped substrate on a plate; and
    spraying a gas containing a coating raw material toward a center hole of the ring-shaped substrate from above the ring-shaped substrate placed on the plate to cause the ring-shaped substrate to float up from the plate and form a film on a surface of the ring-shaped substrate.

2. The method for producing a ring-shaped object according to claim 1,
    wherein the plate is a heated plate.

3. The method for producing a ring-shaped object according to claim 2, wherein the gas is sprayed a plurality of times to repeatedly cause the ring-shaped substrate to float up from the plate and land on the plate a plurality of times.

4. The method for producing a ring-shaped object according to claim 1, wherein a spray pressure of the gas containing the coating raw material is 0.05 to 1.0 MPa.

5. The method for producing a ring-shaped object according to claim 1, wherein the ring-shaped substrate is made of a material including glass, a ceramic material, metal, or resin.

6. The method for producing a ring-shaped object according to claim 1, wherein the film is an electrically conductive film.

7. The method for producing a ring-shaped object according to claim 6, wherein the film contains an electrically conductive metal oxide.

8. The method for producing a ring-shaped object according to claim 1, wherein the ring-shaped object is a spacer for a hard disk drive.

9. A method for producing a ring-shaped object, comprising:

heating processing of placing a ring-shaped substrate on a placement table to heat the ring-shaped substrate; and film formation processing of spraying a gas containing a coating raw material toward the ring-shaped substrate to cause the ring-shaped substrate to float up from the placement table and form a film on a surface of the ring-shaped substrate.

\* \* \* \* \*